United States Patent
Manasek

(10) Patent No.: US 10,578,363 B2
(45) Date of Patent: Mar. 3, 2020

(54) EXTENDED LEG RETURN ELBOW FOR USE WITH A STEEL MAKING FURNACE AND METHOD THEREOF

(71) Applicant: AmeriFab, Inc., Indianapolis, IN (US)

(72) Inventor: Richard J. Manasek, Carmel, IN (US)

(73) Assignee: AMERIFAB, INC., Indianapolis, IN (US)

( * ) Notice: Subject to any disclaimer, the term of this patent is extended or adjusted under 35 U.S.C. 154(b) by 63 days.

(21) Appl. No.: 15/809,128

(22) Filed: Nov. 10, 2017

(65) Prior Publication Data

US 2018/0128546 A1 May 10, 2018

Related U.S. Application Data

(60) Provisional application No. 62/419,995, filed on Nov. 10, 2016.

(51) Int. Cl.
 *F27D 1/12* (2006.01)
 *F16L 43/00* (2006.01)
 *F27D 1/00* (2006.01)

(52) U.S. Cl.
 CPC .............. *F27D 1/12* (2013.01); *F16L 43/001* (2013.01); *F27D 2001/0059* (2013.01); *F27D 2001/0079* (2013.01)

(58) Field of Classification Search
 CPC .................................................. F27D 1/12
 See application file for complete search history.

(56) References Cited

U.S. PATENT DOCUMENTS

| | | | | |
|---|---|---|---|---|
| 1,710,811 A | * | 4/1929 | Dewald | F28F 1/36 165/79 |
| 1,818,769 A | * | 8/1931 | Trainer | F22D 1/06 122/421 |
| 1,931,467 A | * | 10/1933 | Young | F28D 1/0477 165/149 |
| 2,007,309 A | * | 7/1935 | Sengstaken | F22D 1/06 165/162 |
| 4,221,922 A | * | 9/1980 | Okimune | F27D 1/12 110/336 |
| 4,453,500 A | | 6/1984 | Kuhlmann et al. | |

(Continued)

FOREIGN PATENT DOCUMENTS

WO          03/002769 A1    1/2003

OTHER PUBLICATIONS

Korean Intellectual Property Office (KIPO); "Notification of Transmittal of the Internationals Search Report and the Written Opinion of the International Searching Authority, or the Declaration" issued in International Application No. PCT/US2017/061027; dated Feb. 21, 2018; 18 Pages.

*Primary Examiner* — Nathaniel Herzfeld
(74) *Attorney, Agent, or Firm* — Taft Stettinius & Hollister LLP; Stephen F. Rost

(57) ABSTRACT

A 180-degree pipe elbow having one end extending beyond the other end and method of joining a 180-degree pipe elbow to lengths of cooling pipe to form a cooling panel for use in a furnace, boiler or other industrial heating apparatus that benefits from assistance of a cooling panel. Having one end of the elbow extend beyond the other end of the elbow enables the one end to be joined to a length of pipe by welding whereby the joining may be by automatic welding which will reduce manufacturing costs and ensure a quality weld.

12 Claims, 4 Drawing Sheets

(56) References Cited

U.S. PATENT DOCUMENTS

| | | |
|---|---|---|
| 5,241,979 A | 9/1993 | Chang |
| 5,740,196 A | 4/1998 | Johnson et al. |
| 7,544,321 B2 * | 6/2009 | Loebner .................... F27B 3/16 266/241 |
| 2008/0296006 A1 * | 12/2008 | Manasek ................ F27B 3/065 165/177 |

* cited by examiner

US 10,578,363 B2

EXTENDED LEG RETURN ELBOW FOR USE WITH A STEEL MAKING FURNACE AND METHOD THEREOF

RELATED APPLICATIONS

This application claims the benefit of U.S. Provisional Application Ser. No. 62/419,995, filed Nov. 10, 2016, the disclosure of which is hereby incorporated by reference in its entirety.

FIELD OF THE DISCLOSURE

The present disclosure relates to a method and an apparatus for making and repairing cooling pipe(s) used in the operational life of industrial piping systems and metallurgical furnaces (e.g., metal melting/smelting and refining furnaces), boilers, heat changers, and systems components such as roofs, duct work, dust evacuation system components, and any other component requiring heat removal. More particularly, the invention relates to making and/or repair of water cooled equipment that are often designed with a plurality of pipe welded together and require 180 degree returns welded to the pipe ends to complete proper serpentine water flow through the pipes comprising the water cooled equipment.

BACKGROUND OF THE INVENTION

Cooling of industrial heating apparatus is important to the operation and longevity of such apparatus which includes boilers, metallurgical furnaces, e.g., metal melting/smelting and refining furnaces, etc. For example, steel is made by melting and refining steel scrap in an electric arc furnace (EAF). The EAF is considered by those skilled in the art of steel production to be the single most critical apparatus in a steel mill or foundry. Consequently, it is of vital importance that the EAF remain operational for as long as possible.

As production increases furnace availability has become increasingly more important. Although water-cooled panels last longer than the brick refractory they replaced, the panels have serious problems with wear and are subject to damage. It is now common in the steel making industry to expect a critical breakdown of one or more of the panels within a few months of the furnace going on line.

When a breakdown occurs, the damaged water-cooled panels must be replaced as soon as possible. To make this repair in an EAF, the EAF must be taken out of production for unscheduled maintenance. This unscheduled downtime can have serious repercussions throughout the steel mill. For example, when the furnace is down, no molten steel is being produced by the steel mill which can cost as much as five thousand dollars per minute for the production of certain types of steel. Such interruptions also decrease production and significantly increase operating expenses. Also, making unscheduled repairs to the furnace panels constitutes a considerable percentage of maintenance expenses. A need, therefore, exists for promptly repairing the water-cooled furnace panel so that the furnace can return to operation quickly.

SUMMARY

In one embodiment of the present disclosure, a cooling panel coupled to an inner wall of a steel making furnace, including piping sinuously winding between a first end and a second end, the piping including a plurality of section pipes aligned substantially parallel to one another; an inlet formed at the first end of the piping and configured to receive a fluid for cooling the furnace; an outlet formed at the second end of the piping and being in fluid communication with the inlet; a base member configured to couple the piping to the inner wall; and a plurality of return elbows each coupling two of the plurality of section pipes to one another; wherein, each of the plurality of return elbows comprises a first leg and a second leg, the first leg being welded to a first section pipe of the two section pipes and the second leg being welded to a second section pipe of the two section pipes; wherein, the first leg comprises a first length and the second leg comprises a second length, where the first length is greater than the second length.

In one example of this embodiment, each of the plurality of return elbows comprises a substantially semicircular cross-section. In a second example, the first leg is fluidly coupled to the inlet, and the second leg is fluidly coupled to the outlet. In a third example, the first leg is aligned along a first axis; the second leg is aligned along a second axis; the first axis and second axis being offset from and parallel to one another. In a fourth example, the first leg comprises a beveled edge.

In a fifth example of this embodiment, the first length is at least 0.1 inches longer than the second length. In a sixth example, the first length is at least 0.5 inches longer than the second length. In a seventh example, the first length is between 0.1 and 1 inches longer than the second length. In an eighth example, the first end is automatically welded to the first section pipe. In a ninth example, the second leg includes a beveled edge.

In another example of this embodiment, the plurality of return elbows includes material configured to withstand temperatures in the furnace of 3,000° F. to 3,500° F. without undergoing deformation that would impede operation of the plurality of return elbows when used to convey the fluid. Here, the material may be selected from steel, bronze, copper, stainless steel, nickel alloys, seamless carbon pipe and other materials that are suitable for the specific application.

In a further embodiment of the present disclosure, a steel making furnace includes a furnace shell movably disposed on a tilting mechanism, the shell including a hearth, a side wall and a roof; an exhaust system for exhausting gases from the furnace; a water-cooled panel mounted to an inner surface of the side wall, the panel comprising piping sinuously winding between a first end and a second end, the piping including a plurality of section pipes aligned substantially parallel to one another; an inlet formed at the first end of the piping and configured to receive a fluid for cooling the furnace; an outlet formed at the second end of the piping and being in fluid communication with the inlet; a base member configured to couple the piping to the inner wall; and a plurality of return elbows each coupling two of the plurality of section pipes to one another; wherein, each of the plurality of return elbows comprises a first leg and a second leg, the first leg being welded to a first section pipe of the two section pipes and the second leg being welded to a second section pipe of the two section pipes; wherein, the first leg comprises a first length and the second leg comprises a second length, where the first length is greater than the second length.

In a first example of this embodiment, each of the plurality of return elbows comprises a substantially semi-circular cross-section. In a second example, the first leg is fluidly coupled to the inlet, and the second leg is fluidly coupled to the outlet. In a third example, the first leg is aligned along a first axis; the second leg is aligned along a second axis; the first axis and second axis being offset from and parallel to one another. In a fourth example, the first leg and second leg comprise beveled edges.

In another embodiment of the present disclosure, a method of forming a cooling panel for being mounted to an inner wall of a steel making furnace, includes providing a plurality of sections of piping having substantially equal lengths and a plurality of 180-degree shaped return elbows each having a first leg being longer than a second leg; welding a first of the plurality of sections of piping to the first leg of one of the plurality of return elbows via a welding tool during an automatic or semi-automatic welding process; welding a second of the plurality of sections of piping to the second leg of the one return elbow during an automatic, semi-automatic, or manual welding process; and sinuously winding the plurality of sections of piping and plurality of 180-degree shaped return elbows to form the cooling panel.

In one example of this embodiment, the method may include forming an inlet at one end of one of the plurality of sections of piping; and forming an outlet at one end of a different one of the plurality of sections of piping. In a second example, the step of welding the first of the plurality of sections may include positioning the welding tool in close proximity to a beveled edge of the first leg such that the welding tool is substantially perpendicular to a longitudinal axis passing through the first leg, the welding tool being positioned perpendicularly to the longitudinal axis due to a clearance provided by the shorter, second leg.

DETAILED DESCRIPTION

In an electric arc furnace (EAF), a portion above a hearth or smelting area must be protected against the high internal temperatures of the furnace. The EAF vessel wall, cover or roof and duct work are particularly at risk from massive thermal, chemical, and mechanical stresses caused by charging the steel. Such stresses greatly limit the operational life of the furnace. The EAF is generally designed and fabricated as a welded steel structure which is protected against the high temperatures inside the furnace vessel by a refractory lining and water cooled panels. Water-cooled roof panels and water-cooled sidewall panels are located in portions of the furnace vessel above the melting/smelting area of the furnace.

In addition, furnace off-gas ducts are also comprised of a plurality of pipe around its circumference that protect the ductwork from the high temperatures and caustic gases produced during furnace operation. Existing water-cooled panels and ducts are made both with various grades and types of plates and pipes. Using water-cooled panels reduces refractory costs, enables steel makers to operate each furnace for a greater number of heats and enables the furnaces to operate at increased levels of power and chemical energy input. Such panels are designed to incorporate a plurality of pipes in serpentine fashion and hung on the inside wall of the electric arc furnace above the hearth, thereby forming a cooling surface between the interior and the furnace wall.

It is important to maintain a layer of slag on the hot side of the water cooled panels to protect the panels from thermal and arcing degradation during normal furnace operation. Slag cups, slag bars, slag pins and specially designed extruded pipe with splines on the hot side surface of the pipe may be used to retain splattered slag on the hot side surface of the panels. Slag solidifies on the pipes, forming an insulation barrier between the molten iron material and the cooling pipes and, consequently, the wall of the furnace.

Figure 3:
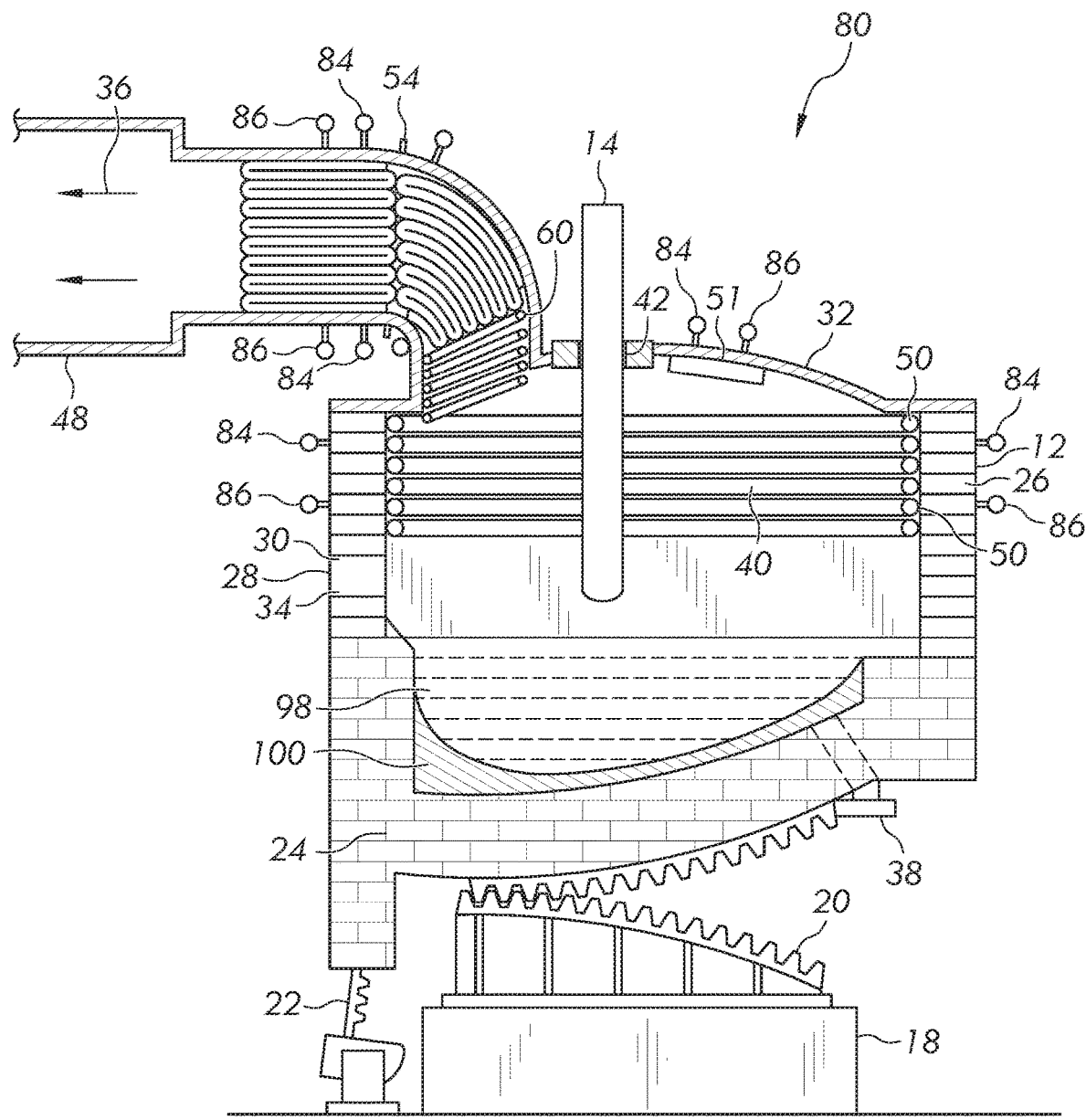
FIG. 3 is a cross-sectional schematic of a steel-making furnace which includes cooling panels with the elbow return of FIGS. 1 and 2.

Referring to FIG. 3, one embodiment of a furnace is illustrated as an EAF type furnace 80. While the EAF is disclosed as one example, it is understood the principles and teachings of the present disclosure may be readily applied in a basic oxygen furnace (BOF) and the like. In FIG. 3, an EAF 80 may include a furnace shell 12, a plurality of electrodes 14, an exhaust system 16, a working platform 18, a rocker tilting mechanism 20, a tilt cylinder 22, and an off gas chamber b. The furnace shell 12 may be movably disposed upon the rocker tilt 20 or other tilting mechanism. Further, the rocker tilt 20 may be powered by the tilt cylinder 22. The rocker tilt 20 may also be further secured upon the working platform 18.

The furnace shell 12 may include a dished hearth 24, a generally cylindrical side wall 26, a spout 28, a spout door 30, and a general cylindrical circular roof 32. The spout 28 and spout door 30 are located on one side of the cylindrical side wall 26. In the open position, the spout 28 may allow intruding air 34 to enter the hearth 24 and partially burn gasses 36 produced from smelting. The hearth 24 is formed of a suitable refractory material. At one end of the hearth 24 is a pouring box having a tap means 38 at its lower end. During a melting operation, the tap means 38 is closed by a refractory plug, or a slidable gate. Thereafter, the furnace shell 12 is tilted, the tap means 38 is unplugged, or open and molten metal is poured into a teeming ladle, tundish, or other device, as desired.

Figure 4:
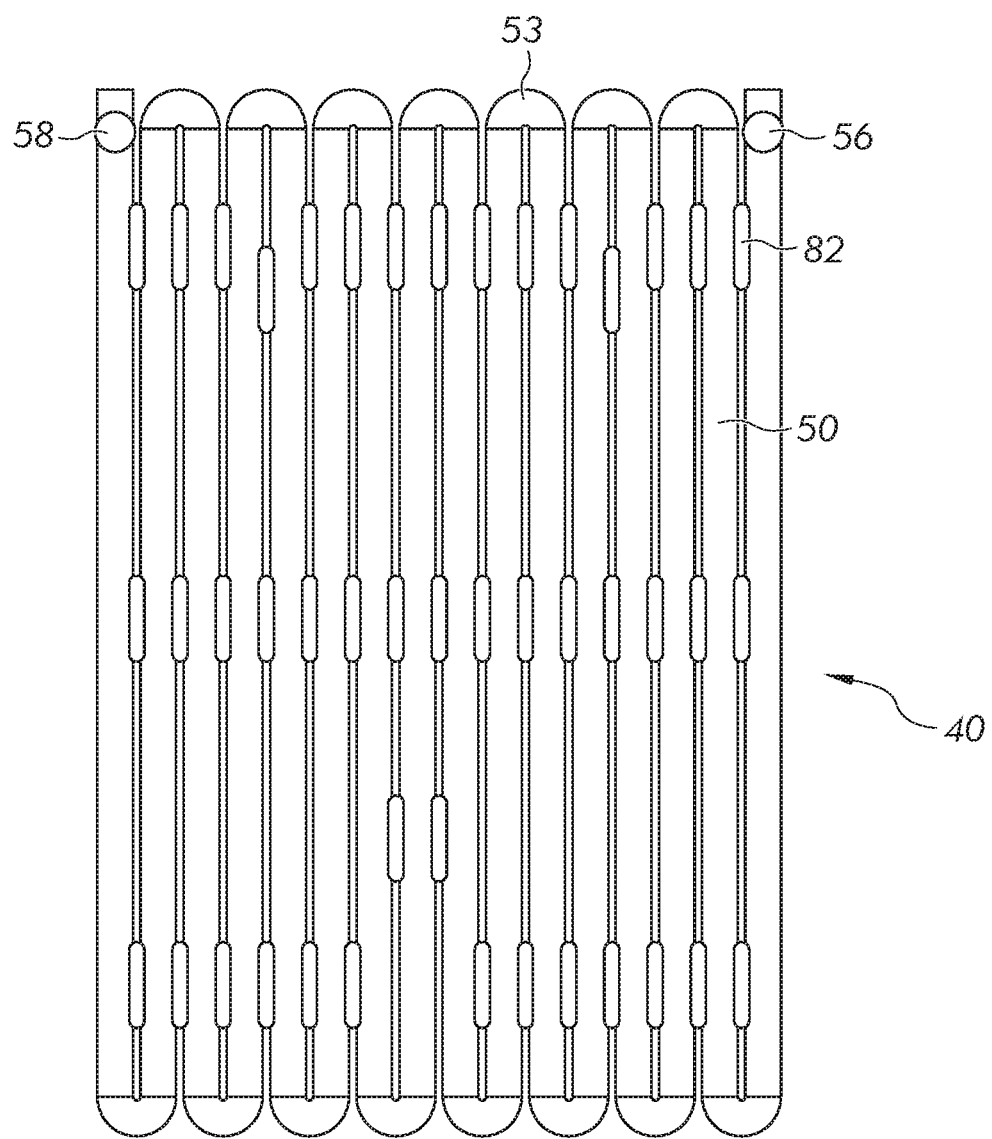
FIG. 4 is a side view of a cooling panel of sinuously winding piping and the elbow return of FIGS. 1 and 2.

The inside wall 26 of the furnace shell 12 may be fitted with water cooled panels 40 of sinuously winding piping 50 (see FIG. 4). The panels, in effect serve as an interior wall in the furnace 80. The manifolds, which supply cool water and a return, are in fluid communication with the panels 40. Typically, the manifolds are positioned peripherally in a fashion similar to the illustrated exhaust ducts 44.

The heat exchanger system 10 produces a more efficient operation and prolongs the operation life of the EAF furnace 10. In one illustrative embodiment, the panels 40 may be assembled such that the sinuously winding piping has a generally horizontal orientation. The piping 50 can be linked with a linkage or have a base that is mounted to the wall. Alternatively, the panels 40 can be mounted such that the sinuously winding piping 50 has a generally vertical orientation as shown in FIG. 4. The upper ends of the panels 40 may define a circular rim at the upper margin of the side wall 26 portion of the furnace 80.

The heat exchanger system 10 can be fitted to the roof 32 of the furnace 80, wherein the water cooled panels 40 have a curvature that substantially follows the domed contour of the roof 32. The heat exchanger system 10 may be deployed on the inside of side wall 26 of the furnace 80, the roof 32 and the entrance of the exhaust system 16, as well as throughout the exhaust system 16. As such, the heat exchanger system 10 can protect the furnace and cools the hot waste gasses 36 as they are ducted to a bag house or other filtering and air treatment facilities, where dust is collected and the gasses are vented to the atmosphere.

In operation, hot waste gasses 36, dust and fumes are removed from the hearth 24 through a vent 46 in the furnace shell 12. The vent 46 may be in communication with an exhaust system.

Referring to FIG. 4, the panel 40 can have a plurality of axially arranged pipes 50. U-shaped elbows 53 can connect adjacent sectional lengths of piping or pipes 50 together to form a continuous piping system. Linkages 82 that additionally serve as spacers may be between adjacent pipes 50, and they provide structural integrity of the panel 40 and are determinative of curvature to the panel 40.

As shown in the embodiment of FIG. 4, the heat exchange system or heat exchanger 10 may include at least one panel of the sinuously winding piping 50 having an inlet 56 and an outlet 58, an input manifold in fluid communication with the inlet 56 of the at least one panel, an-output manifold in fluid communication with the outlet 58 of the at least one panel, and a cooling fluid flowing through the piping 50. The heat exchanger system 10 cools hot fume gasses 36 and dust that is being evacuated from the metallurgical furnace 80 and its supporting components. The piping is an assemblage of sectional lengths of connected tubes mounted side-by-side, wherein the connected tubes are secured to each other with the linkage 82, therein forming the at least one panel 50.

It has been determined that one illustrative and desirable composition for fabricating the piping 50 is of an aluminum bronze alloy. Aluminum bronze alloys have been found to have a higher than expected thermal conductivity, resistance to etching by the stream of hot gasses (modulus of elasticity), and good resistance to oxidation. Thus, the operational life of the heat exchanger is extended. Corrosion and erosion of the heat exchanger and related components is reduced, when they are fabricated with aluminum bronze. Aluminum bronze has thermal conductivity that is 41% higher than P22 (about 96% Fe, 0.1% C, 0.45% Mn, 2.65% Cr, 0.93% Mo) and 30.4% than carbon steel (A106B). The heat exchangers fabricated using aluminum bronze and alloys thereof are more efficient, and have a longer operational life than furnace constructed of refractory materials and or other metal alloys.

It has also been determined that the piping 50 may be extruded, and that extruding may help the piping resist corrosion, erosion, pressure, and thermal stress. The piping can be curved or bent to match the curvature of a wall to which it is being attached, if so needed. More typically, the individual sections of piping are secured to each other with an angled linkage such that the resulting panel has a curvature that is comparable to the curvature of the wall.

In the embodiments of FIGS. 3 and 4, the sinuously winding piping 50 may be formed by a plurality of longitudinal piping sections in which two of the piping sections are connected by an elbow. It is often difficult to assemble these sections to the elbows, and this disclosure provides one such arrangement to better facilitate and improve the welding process.

In particular, the present disclosure is directed to providing a weld joint in a manner so as to significantly increase manufacturing efficiency, to provide a high quality weld joint and to reduce the cost of providing water cooled panels and ducts for all of the above mentioned applications. Cooling apparatii aid in extending the operational life of metallurgical furnaces, boilers, heat exchangers and duct systems, and for maintaining such apparatii in an operating condition at least until regular maintenance is scheduled to occur, thereby avoiding costly downtime. Although the principles and teachings of the present disclosure can be used in conjunction with most metallurgical furnaces, this disclosure will be described herein with regard to electric arc steel making furnaces (i.e., EAF).

The present disclosure further includes a 180-degree pipe elbow having one end extending beyond the other end and a method of joining this 180-degree pipe elbow to sectional lengths of cooling pipe to form a serpentine or sinuously winding cooling panel for use in a furnace, boiler or other industrial heating apparatus that benefits from assistance of a cooling panel. Having one end of the elbow extend beyond the other end of the elbow enables the one end to be joined to a length of pipe by welding whereby the joining may be by off-line manual and/or automatic welding which will reduce manufacturing costs and ensure a quality weld.

The new elbow design eliminates much of the difficulty in welding both legs of a 180 degree return onto the two adjacent pipe ends forming the duct. The present design is an improvement over a design where both legs of the return have an identical length. Welding the inner portion of an elbow having a 180-degree return is difficult because there is insufficient or very confined space for a weld nozzle to enter the area where two adjacent pipes meet. A weld nozzle and equipment for the proper flow and direction of weld gases is needed to accomplish a weld on both ends of the elbow comprising a 180-degree return. Because of the spacing issue, welding this area of the 180 degree returns is very time consuming and can result in incomplete and compromised welds that result in immediate water leaks that must be repaired and/or potential premature failure of the weld during high temperature operation in the water cooled device. The present disclosure provides an improved arrangement to overcome many of the disadvantages in the art.

Figure 1:
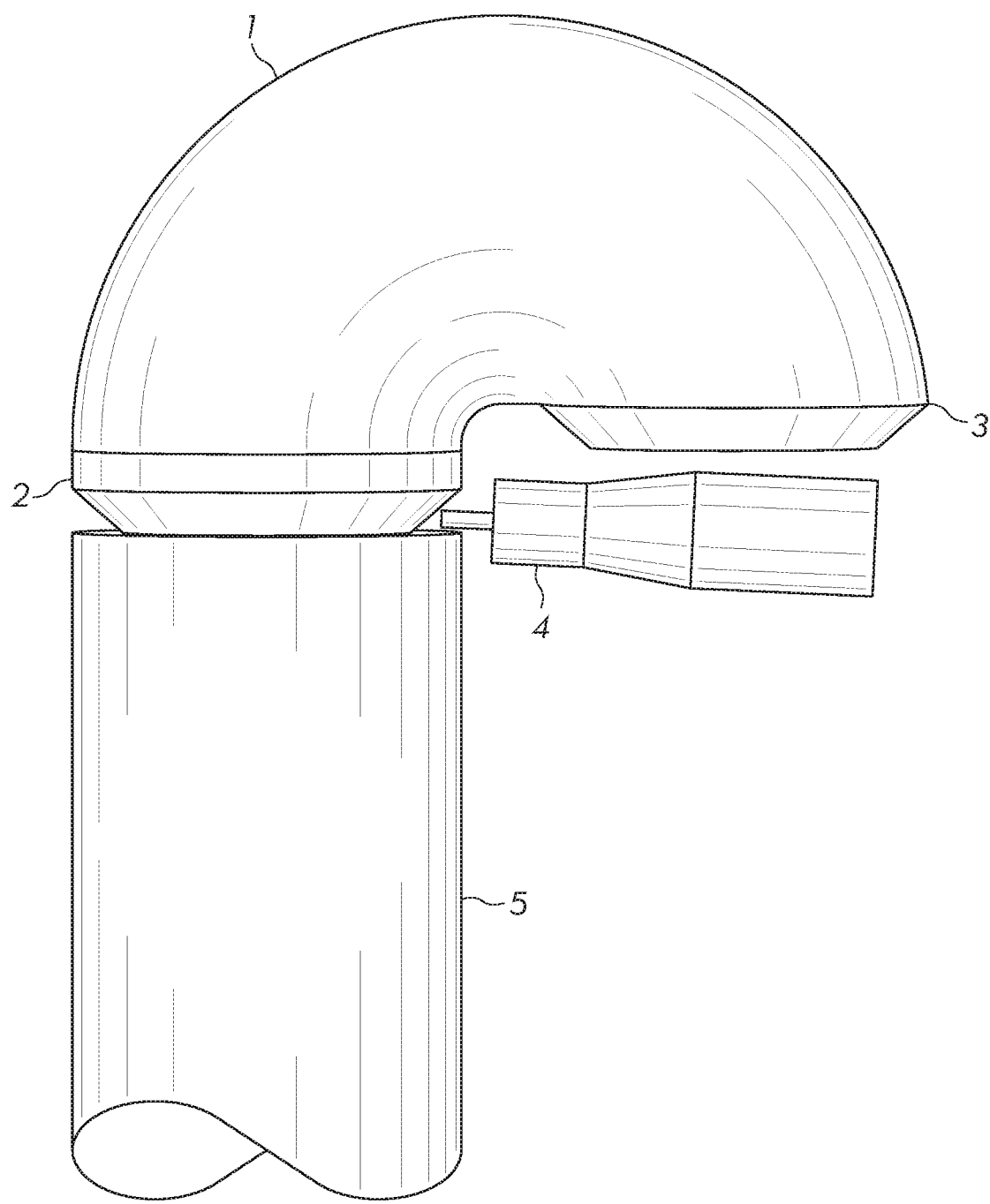
FIG. 1 is a side view of a 180-degree elbow return and one leg of a liquid-cooled panel according to the invention.
Figure 2:
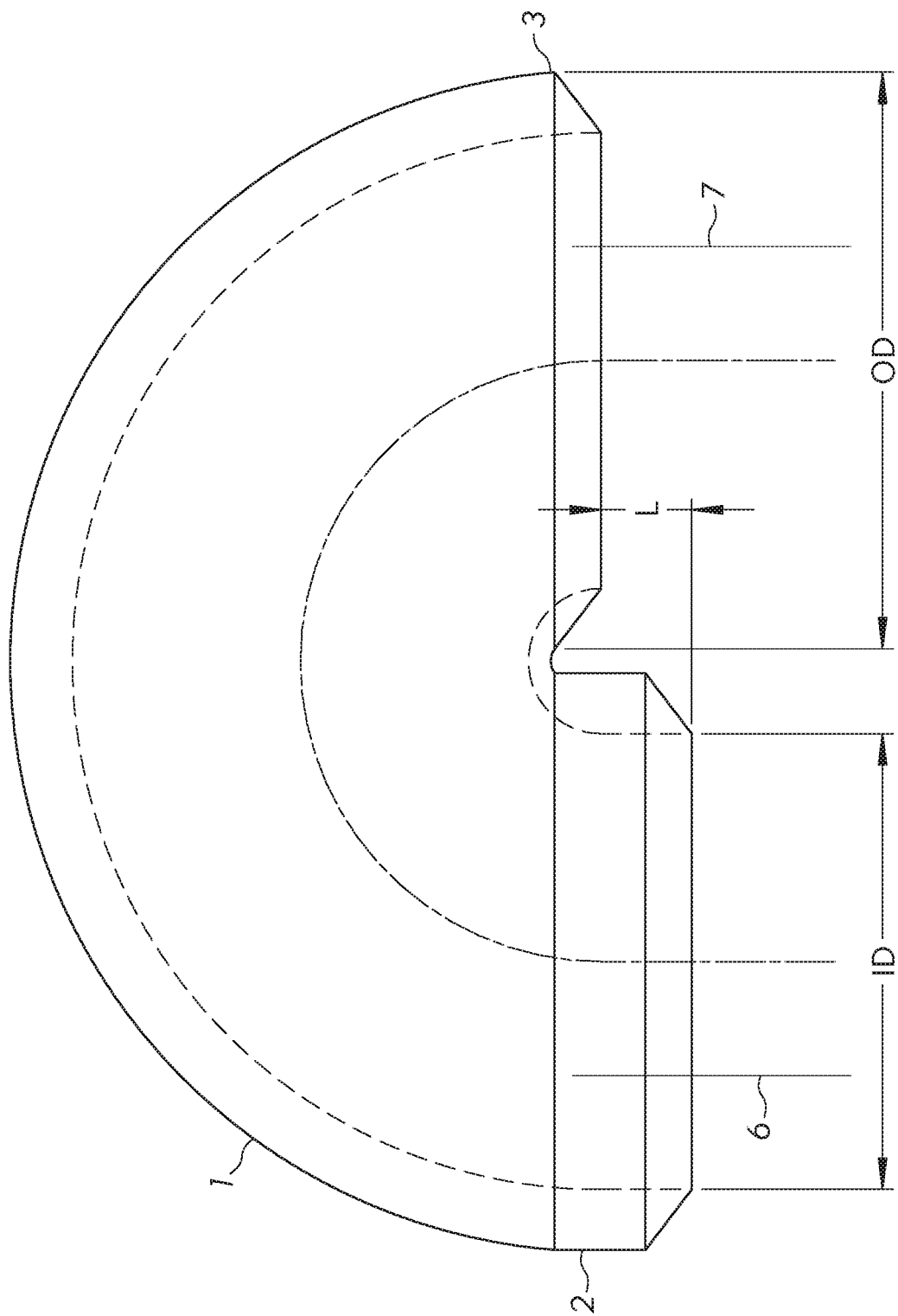
FIG. 2 is a cross-section of the 180-degree elbow of FIG. 1.

In one embodiment of the present disclosure, serpentine cooling pipe is made by providing a plurality of lengths of pipe joined by a U-shaped or 180-degree pipe return. As seen in FIG. 1, the 180-degree pipe degree return (elbow) 1 includes a length of pipe that is curved about 180 degrees. The return 1 includes a first end 2 and a second end 3 such that both ends 2, 3 extend along substantially parallel axes. In FIG. 2, for example, the first end 2 is axially aligned with a first axis 6, and the second end 3 is axially aligned with a second axis 7. The first axis 6 and the second axis 7 are spaced from and parallel to one another.

Moreover, the outside diameter, OD, of the return 1 is illustrated in FIG. 2. In one non-limiting example, the OD may be approximately 3½ inches. In addition, the inside diameter, ID, is also shown and it may be approximately 2¾ inches in one non-limiting example. Axes 6 and 7 are different ends of the same pipe axis.

As shown also in FIG. 2, one end 2 of the 180-degree pipe return is longer than the other end 3 of the 180-degree pipe return (elbow). In one example, the first end 2 may be at least 0.1 inch longer than the second end 3. In another example, the first end 2 may be at least 0.25 longer. In a further example, the first end 2 may be 0.5 inch longer. In yet a further example, the first end may be at least 1 inch longer than the second end 3. In yet another example, the first end 2 may be between 0.1 and 6 inches longer than the second end 3.

The additional length of the first end 2 of the return elbow 1 may provide sufficient space to allow either automatic or semi-automatic welding using, for example, an electrode 4. Moreover, additional space may be allowed for manual welding of the joint between the 180-degree elbow 1 and a respective connection pipe 5. At the joint shown in FIG. 1, the electrode 4 or other welding tool may be placed in close proximity to a beveled edge of the first end 2 such that it is able to apply a consistent and high-quality weld along the beveled edge without interference from the second end 3. As shown, the electrode 4 or other welding tool may be positioned approximately perpendicular to the first axis 6. The shorter, second end 3 provides the space or clearance to allow the electrode 4 to be positioned as shown in FIG. 1. This can be particularly important in the tight space or confines of a steel making furnace, e.g., an EAF, where it can be difficult to install, assemble or repair piping of the cooling panel.

Although only one connection pipe 5 is shown, it is to be understand that a connection pipe 5 may be coupled to both the first end 2 and the second end 3 of the return elbow 1. The connection pipes 5 may correspond with the piping 50 of FIGS. 3 and 4.

The second end 3 may be joined to the different connection pipe 5 (not shown) with the joining of the second end 3 to the different connection pipe 5 being by welding with, for example, part of the weld being made by automatic welding and the remainder of the weld being made manually (human hand operation of the weld equipment).

For purposes of this disclosure, automatic welding is defined as where a custom machine, or series of machines, loads the workpiece, indexes the part and the welder head into position, accomplishes the weld, monitors the quality of the joint and unloads the finished product. Depending on the operation, a machine operator may be necessary.

Semiautomatic welding is defined as where an operator manually loads the parts into the welding fixture, a welder controls the welding process, motion of the torch, and stillness of the parts to preset parameters. After the weld is completed, the operator removes the completed assembly and the process begins again.

Manual welding is defined as where the welder head (electrode, etc.) is operated during welding by the hand of a human.

Automatic welding or semiautomatic welding (as compared to manual welding) of the first end 2 of the 180-degree pipe return 1 to a connection pipe 5 may improve weld quality, increases output, decreases scrap, decreases variable labor costs and significantly increases manufacturing efficiency. Both automatic welding and semiautomatic welding may result in a consistent quality weld without potential for weld interruption or weld gas shrouding issues that might cause weld defects which would result in weld failure and leaks in critical water cooled equipment. Automatic and semiautomatic weld quality provides weld integrity and repeatability. Manual welding (by humans) may result in a "smoothing over" of a mistake with the torch, hiding lack of penetration or a possibly flawed weld.

When making serpentine cooling panels having a plurality of 180-degree pipe returns 1 with welds joining ends of such pipe returns 1 to connection pipes 5, forming one end of each pipe return 1 to extend axially beyond the respective other end of that pipe return 1 provides space for the weld electrode (torch) 4 of an automatic or semiautomatic welder to weld part 5 to end 2 of part 1. As seen in FIG. 1, the added length, L, of the first end 2 provides additional room for operation of the automatic or semiautomatic welder to operate whereas if ends 2 and 3 were the same axial length the automatic welder would be obstructed by the end not being welded. This design of the pipe return 1 can save many hours of manual weld time and repeatedly provides a quality weld.

The extended Length 180 Degree Return Elbow 1 is manufactured with two legs, as shown, one of which (2) is extended in length to allow for better access during manual welding and application of automatic or semiautomatic welding procedures. As seen in FIG. 2, the first end 2 extends axially along a first central axis 6 and the second end 3 extends axially along a second central axis 7, where both axes 6 and 7 are spaced generally parallel to one another. The length of the leg at end 2 can be adjusted to whatever length is required for the specific application and material. The 180 degree return elbow 1 can be cast, from plate or bent from pipe. The elbows 1 can be manufactured from a variety of materials such as steel, stainless steel, copper, bronze, nickel alloys or any material that may be practically used in water cooled equipment. The material selected for each of the 180 degree return elbows 1 must be capable of withstanding temperatures in the range of 3,000° F. to 3,500° F. without undergoing deformation that would impede operation of the pipe when used to convey fluid. Using the above discussed welding technique permits cooling panels (serpentine pipe configurations) to be constructed with less time and higher quality. These cooling panels may be used as new or replacement cooling panels for industrial furnaces, etc.

Reliance on human welders can dramatically increase a manufacturer's labor costs. Welded pipe connections for cooling panels provided in the manner discussed herein means that welding time per return leg can be decreased but 50% or more and the quality of the weld will be more consistent than a manual weld. The net result is that the water cooled device will have a lower maintenance and longer economic operating life.

It is to be understood that the foregoing description and specific embodiments are merely illustrative of the best mode of the invention and the principles thereof, and that various modifications and additions may be made to the process, device and apparatus by those skilled in the art, without departing from the spirit and scope of this invention, which is therefore understood to be limited only by the scope of the appended claims.

The invention claimed is:

1. A cooling panel configured to be coupled to an inner wall of a steel making furnace, the cooling panel comprising:
   piping sinuously winding between a first end and a second end, the piping including a plurality of section pipes aligned substantially parallel to one another;
   an inlet formed at the first end of the piping and configured to receive a fluid for cooling the furnace;
   an outlet formed at the second end of the piping and being in fluid communication with the inlet;
   a base member configured to couple the piping to the inner wall; and
   a plurality of one-piece return elbows each coupling two of the plurality of section pipes to one another;
   wherein, each of the plurality of one-piece return elbows comprises a first leg and a second leg, the first leg being welded to a first section pipe of the two section pipes and the second leg being welded to a second section pipe of the two section pipes;
   wherein, the first leg comprises a first length and the second leg comprises a second length, where the first length is greater than the second length.

2. The cooling panel of claim 1, wherein each of the plurality of one-piece return elbows comprises a substantially semicircular cross-section.

3. The cooling panel of claim 1, wherein the first leg is fluidly coupled to the inlet, and the second leg is fluidly coupled to the outlet.

4. The cooling panel of claim 1, wherein:
the first leg is aligned along a first axis;
the second leg is aligned along a second axis;
the first axis and second axis being offset from and parallel to one another.

5. The cooling panel of claim 1, wherein the first leg comprises a beveled edge.

6. The cooling panel of claim 1, wherein the first length is at least 0.1 inches longer than the second length.

7. The cooling panel of claim 1, wherein the first length is at least 0.5 inches longer than the second length.

8. The cooling panel of claim 1, wherein the first length is between 0.1 and 1 inches longer than the second length.

9. The cooling panel of claim 1, wherein the first end is automatically welded to the first section pipe.

10. The cooling panel of claim 1, wherein the second leg comprises a beveled edge.

11. The cooling panel of claim 1, wherein the plurality of one-piece return elbows comprises material configured to withstand temperatures in the furnace of 3,000° F. to 3,500° F. without undergoing deformation that would impede operation of the plurality of one-piece return elbows when used to convey the fluid.

12. The cooling panel of claim 11, wherein the material is selected from steel, bronze, copper, stainless steel, nickel alloys, seamless carbon pipe and other materials that are suitable for the specific application.

* * * * *